US012278437B2

(12) United States Patent
Xu et al.

(10) Patent No.: US 12,278,437 B2
(45) Date of Patent: Apr. 15, 2025

(54) BASE STATION ANTENNA

(71) Applicant: Suzhou Luxshare Technology Co., Ltd., Suzhou (CN)

(72) Inventors: WenKai Xu, Suzhou (CN); KangNing Lv, Suzhou (CN); ChengYu Xu, Suzhou (CN); ZhenHua Li, Suzhou (CN); WanQiang Zhang, Suzhou (CN); ZhengGuo Zhou, Suzhou (CN); Gang Zhou, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 196 days.

(21) Appl. No.: 18/071,868

(22) Filed: Nov. 30, 2022

(65) Prior Publication Data

US 2023/0170621 A1 Jun. 1, 2023

(30) Foreign Application Priority Data

Dec. 1, 2021 (CN) ......................... 202111451772.3

(51) Int. Cl.

*H01Q 1/24* (2006.01)
*H01Q 1/12* (2006.01)
*H01Q 9/04* (2006.01)

(52) U.S. Cl.

CPC ......... *H01Q 9/0485* (2013.01); *H01Q 1/1228* (2013.01); *H01Q 1/246* (2013.01)

(58) Field of Classification Search

CPC ............ H01Q 1/246; H01Q 3/32; H01Q 1/38; H01Q 3/34

See application file for complete search history.

(56) References Cited

U.S. PATENT DOCUMENTS

| | | | | |
|---|---|---|---|---|
| 2012/0200474 A1* | 8/2012 | Sabielny | H01Q 21/061 343/879 |
| 2021/0320399 A1* | 10/2021 | Bisiules | H01Q 21/24 |
| 2022/0166129 A1* | 5/2022 | Tang | H01Q 1/246 |
| 2022/0216617 A1* | 7/2022 | Kasani | H01Q 19/10 |

(Continued)

FOREIGN PATENT DOCUMENTS

| | | | |
|---|---|---|---|
| CN | 208970757 U | 6/2019 | |
| CN | 113161746 A | 7/2021 | |
| WO | WO-2022066406 A1 * | 3/2022 | H01Q 1/246 |

*Primary Examiner* — David E Lotter

(74) *Attorney, Agent, or Firm* — Birch, Stewart, Kolasch & Birch, LLP

(57) ABSTRACT

A base station antenna including a substrate, a plurality of oscillators, a control assembly, and a dielectric plate is provided. The substrate includes a first surface and a second surface disposed opposite to the first surface. The plurality of oscillators are disposed on the first surface of the substrate. The control assembly is disposed on the second surface of the substrate and electrically connected to the plurality of oscillators. The dielectric plate is disposed corresponding to the first surface of the substrate, and the plurality of oscillators are disposed between the first surface and the dielectric plate. Through the above arrangement, the base station antenna can have lower construction cost and debugging labor cost, and can eliminate influences of an antenna cover on antenna radiation performance at the same time.

12 Claims, 7 Drawing Sheets

(56) References Cited

U.S. PATENT DOCUMENTS

| | | | | |
|---|---|---|---|---|
| 2022/0416422 | A1 * | 12/2022 | Shahvirdi Dizaj Yekan ............... | H01Q 1/3233 |
| 2023/0139300 | A1 * | 5/2023 | Udagave .................. | H01Q 3/32<br>342/368 |

* cited by examiner

BASE STATION ANTENNA

CROSS REFERENCE TO RELATED APPLICATION

This application claims the priority benefit of Chinese Patent Application Serial Number 202111451772.3, filed on Dec. 1, 2021, the full disclosure of which is incorporated herein by reference.

BACKGROUND

Technical Field

The present disclosure relates to the technical field of communication, particularly to a base station antenna.

Related Art

Base station antenna is an important connecting bridge in mobile communication equipment, in which the quality of base station antenna affects the communication quality of mobile equipment. Currently, MIMO (Multi-input Multi-output) technology, which uses multiple radiation units for signal transmission and reception, is one of the key technologies for 5G and has attracted much attention in the industry. MIMO technology uses a large number of array antennas at the base station transceiver to achieve greater wireless data traffic and connection reliability. Compared with the previous single/dual polarization antennas and 4/8 channel antennas, the large-scale antenna technology can improve the spectrum and energy utilization efficiency through different dimensions (air domain, time domain, frequency domain, polarization domain, etc.). 3D assignment and channel prediction technology can adaptively adjust the phase and power of each antenna oscillator, significantly improve the beam pointing accuracy of the system, focus the signal strength on a specific pointing area and a specific user group, enhance the user signal while significantly reducing the self-interference and neighbor interference within a small area, thus becoming an excellent technology to improve the user signal carrier ratio.

In current base station antenna, the most common oscillator is die-cast oscillator, which is coupled with ¼ wavelength metal feeders through metal die-cast molding radiation body to achieve radiation effect. However, the die-casting oscillator has disadvantages such as: (1) large size, inconvenient for flexible installation, and high cost; (2) welding inconvenience, and metal oscillators need to be used with coaxial wires, the feeders, and insulating spacers; and (3) beam widths of patterns of array antennas are not sufficiently convergent and performance is poor. On the other hand, current base station antennas are using cavity phase shifters to adjust phases and change down tilt angles to achieve effects of electromodulation. However, material costs of the cavity phase shifters are high, and in addition to the difficulty of assembly, it also has problems of difficult maintenance in case of failure. Furthermore, the current base station antenna is to optimize an overall antenna performance by adjusting a height of the array and the performance of the oscillators, which not only wastes debugging labor during an adjustment period, but also has poor consistency in adjustment results.

In view of this, how to provide a base station antenna, so that it can have lower construction cost and debugging labor cost, and can eliminate influences of an antenna cover on antenna radiation performance at the same time, so as to have excellent transmitting and receiving performance, is a problem that needs to be solved urgently in the industry.

SUMMARY

The present disclosure provides a base station antenna, which can solve problems of high construction cost, difficult installation and maintenance, poor antenna performance, and waste of debugging labor caused by current base station antennas using die-casting oscillators and cavity phase shifters.

In order to solve the above technical problems, the present disclosure is realized in this way:

A base station antenna is provided, which comprises:

- a substrate comprising a first surface and a second surface disposed opposite to the first surface;
- a plurality of oscillators, disposed on the first surface of the substrate;
- a control assembly, disposed on the second surface of the substrate and electrically connected to the plurality of oscillators; and
- a dielectric plate, disposed corresponding to the first surface of the substrate, wherein the plurality of oscillators are disposed between the first surface and the dielectric plate.

In the base station antenna of the disclosure, a first distance is between the dielectric plate and a top surface of the plurality of oscillators away from the first surface, and the first distance is 0.25 times a wavelength of a center frequency point of the base station antenna.

In the base station antenna of the disclosure, a first distance is between the dielectric plate and a top surface of the plurality of oscillators away from the first surface, and the first distance is 17 mm.

In the base station antenna of the disclosure, the dielectric plate is a FR4 dielectric plate.

In the base station antenna of the disclosure, the plurality of oscillators are PCB oscillators, and a working frequency band of the plurality of oscillators ranges from 3.4 GHz to 4.2 GHz.

In the base station antenna of the disclosure, a plurality of spacers are provided on the first surface of the substrate, and the dielectric plate is disposed on the plurality of spacers so as to be located above the plurality of oscillators.

In the base station antenna of the disclosure, the plurality of oscillators are disposed at intervals on the first surface of the substrate, two adjacent oscillators of the plurality of oscillators have a first interval in a first direction, and the first interval is 0.7 times a wavelength of a center frequency point of the base station antenna.

In the base station antenna of the disclosure, two adjacent oscillators of the plurality of oscillators have a second interval in a second direction perpendicular to the first direction, and the second interval is 0.6 times the wavelength of the center frequency point of the base station antenna.

In the base station antenna of the disclosure, the plurality of oscillators are disposed at intervals on the first surface of the substrate, two adjacent oscillators of the plurality of oscillators have a first interval in a first direction, and the first interval is 55 mm.

In the base station antenna of the disclosure, two adjacent oscillators of the plurality of oscillators have a second interval in a second direction perpendicular to the first direction, and the second interval is 48 mm.

In the base station antenna of the disclosure, the control assembly comprises a plurality of phase shifters and a plurality of power dividers, the plurality of phase shifters and the plurality of power dividers are disposed on the second surface of the substrate, the plurality of power dividers are disposed between the plurality of oscillators and the plurality of phase shifters, one end of the plurality of power dividers is electrically connected to the plurality of oscillators, and the other end of the plurality of power dividers is electrically connected to the plurality of phase shifters.

In the base station antenna of the disclosure, the power divider is electrically connected to the phase shifter by a coaxial cable.

In the base station antenna of the disclosure, the control assembly further comprises a motor drive system disposed on the second surface of the substrate, the motor drive system pulling a slide to adjust a downward tilt of the plurality of phase shifters.

In the base station antenna of the disclosure, the base station antenna further comprises an antenna cover, the antenna cover covers the substrate, the plurality of oscillators, the control assembly, and the dielectric plate, the dielectric plate is located between the antenna cover and the oscillators.

In the embodiment of the disclosure, by making the first distance between the dielectric plate and the top surface of the plurality of oscillators, and making the dielectric plate an FR4 dielectric plate, the wavelength of electromagnetic waves on an antenna surface can be changed after entering the FR4 dielectric plate so as to eliminate influences of the antenna cover on the wavelength of electromagnetic waves, thus making the base station antenna have excellent transmitting and receiving performance.

BRIEF DESCRIPTION OF THE DRAWINGS

The accompanying drawings illustrated herein are used to provide a further understanding of the present disclosure and form part of the present disclosure. The embodiments of the present disclosure and the description thereof are used to explain the present disclosure and do not constitute an undue limitation of the present disclosure.

DETAILED DESCRIPTION OF THE EMBODIMENTS

The technical solution in the embodiments of the present disclosure will be clearly and completely described below with reference to the accompanying drawings in the embodiments of the present disclosure. It is to be understood that the described embodiments are merely exemplary of the disclosure, and not restrictive of the full scope of the invention. All other embodiments, which can be obtained by a person skilled in the art without inventive step based on the embodiments of the present disclosure, are within the scope of the present disclosure.

Figure 1:
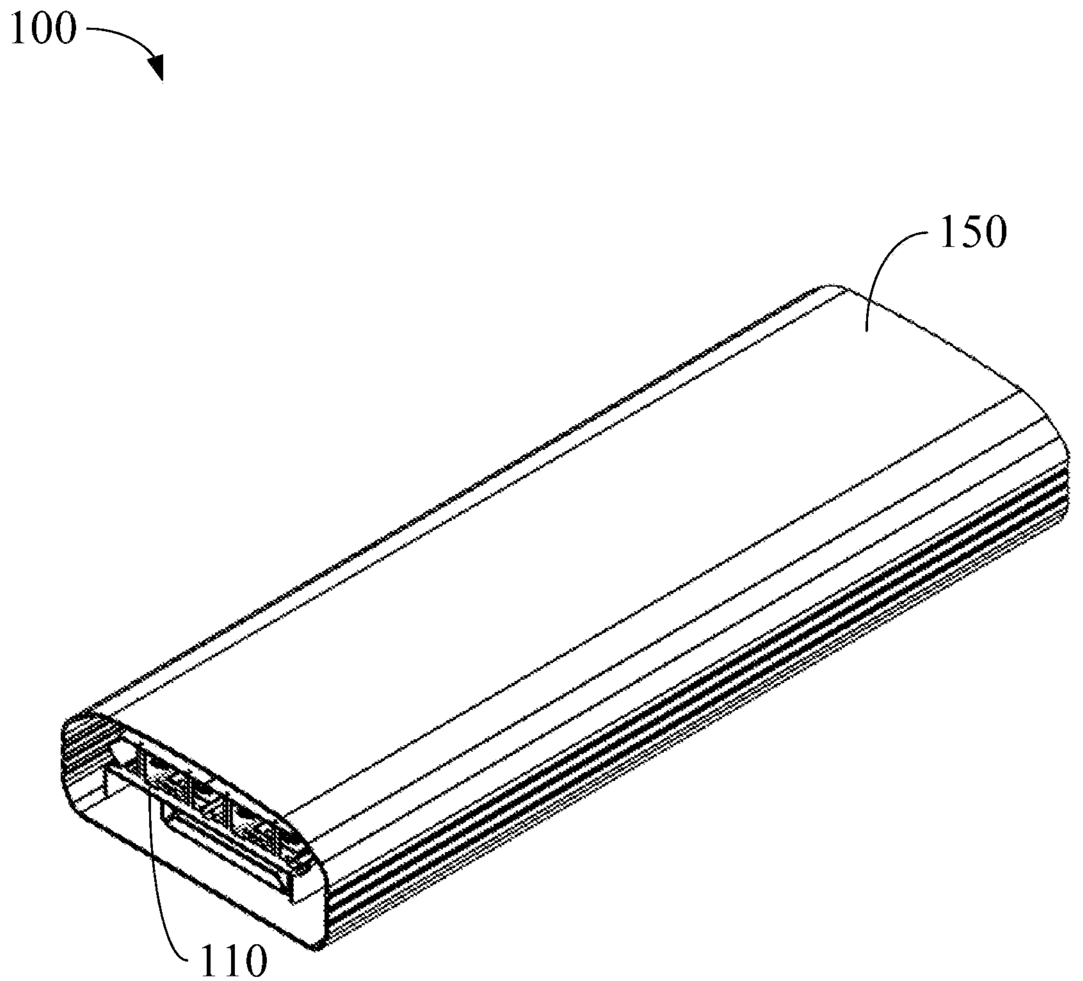
FIG. 1 is a perspective view of a base station antenna of the present disclosure.
Figure 2:
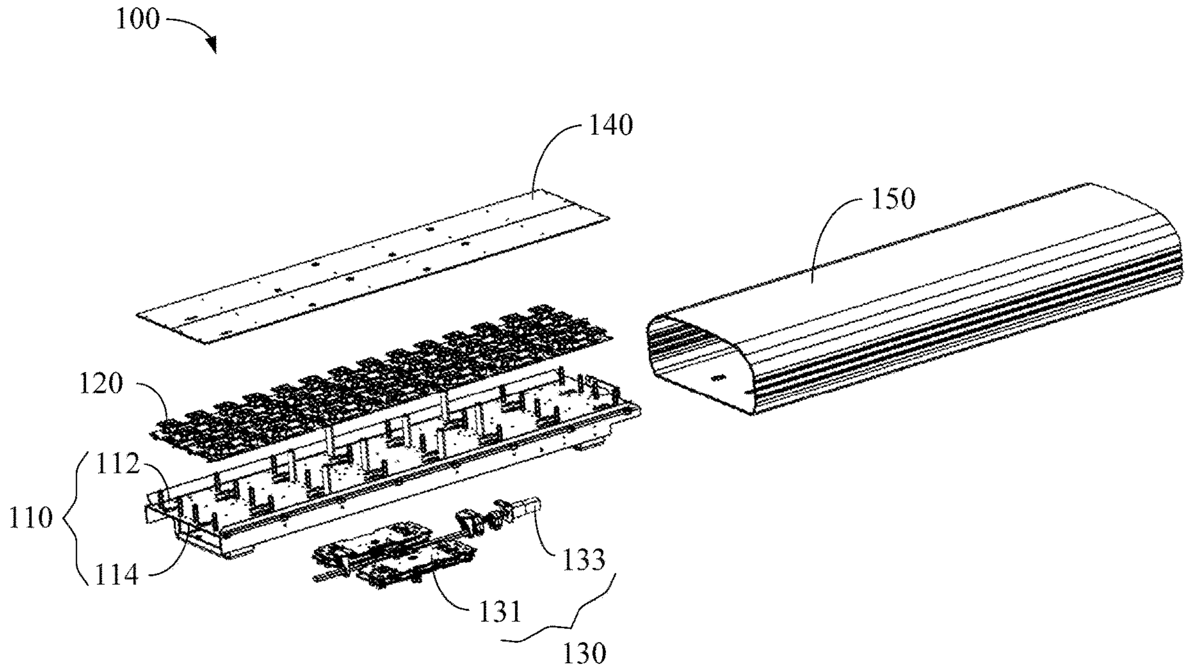
FIG. 2 is an exploded view of the base station antenna of the present disclosure.
Figure 3:
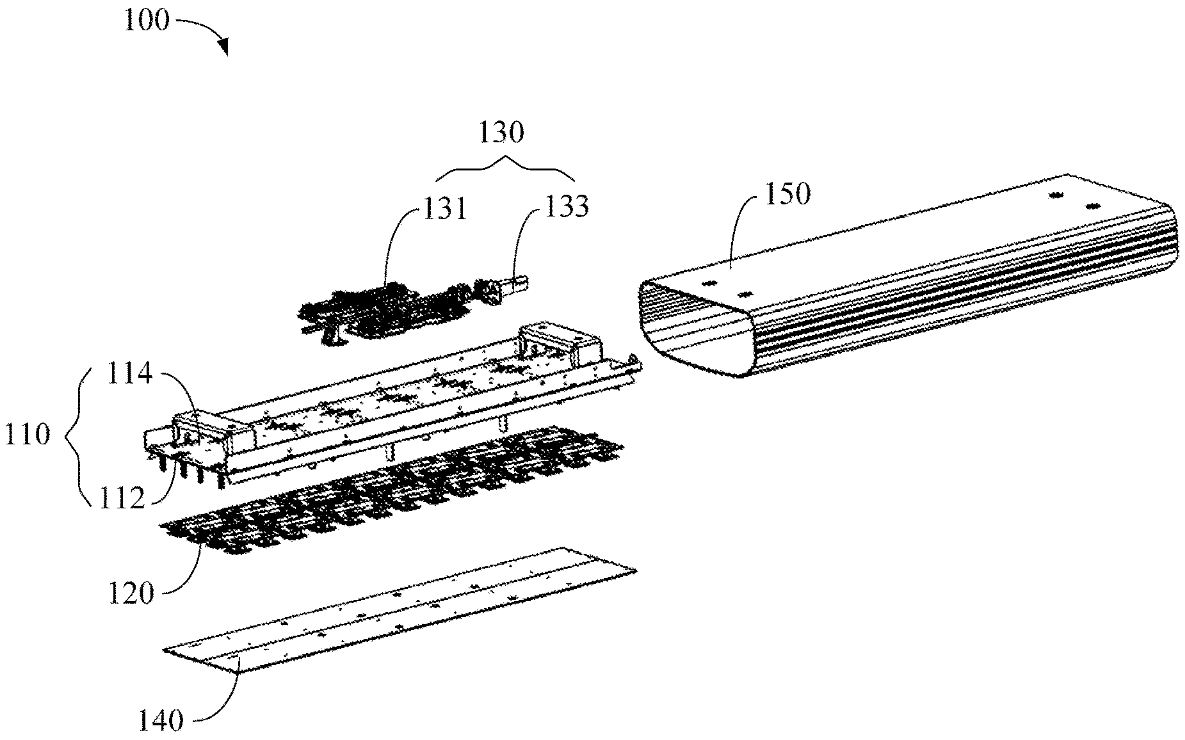
FIG. 3 is another exploded view of the base station antenna of the present disclosure.
Figure 4:
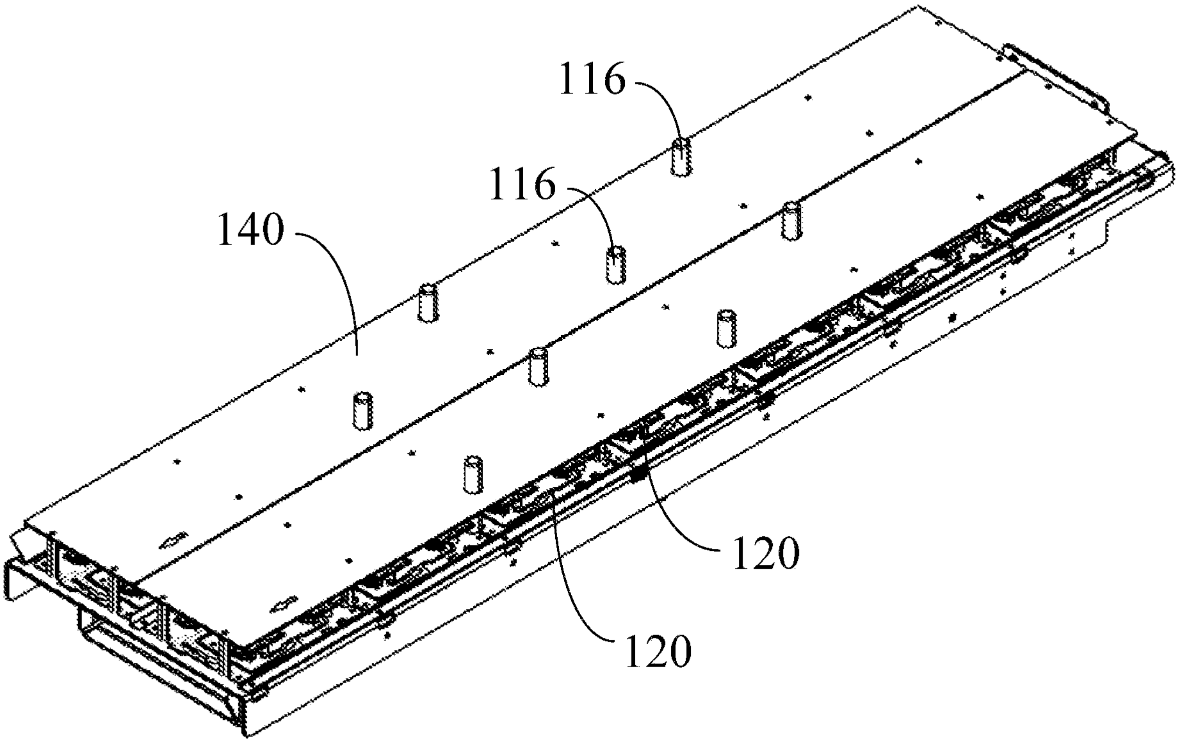
FIG. 4 is a perspective view of the base station antenna of the present disclosure after removing an antenna cover.

As shown in FIGS. 1, 2 and 3, a base station antenna 100 of the present disclosure comprises a substrate 110, a plurality of oscillators 120, a control assembly 130, and a dielectric plate 140. The substrate 110 comprises a first surface 112 and a second surface 114 disposed opposite to the first surface 112. The plurality of oscillators 120 are disposed on the first surface 112 of the substrate 110 and are used to guide and amplify electromagnetic radiation emitted by the base station antenna 100. The control assembly 130 is disposed on the second surface 114 of the substrate 110 and is electrically connected to the plurality of oscillators 120. As shown in FIG. 4, the dielectric plate 140 is disposed corresponding to the first surface 112 of the substrate 110 and the plurality of oscillators 120 are located between the first surface 112 and the dielectric plate 140.

Figure 5:
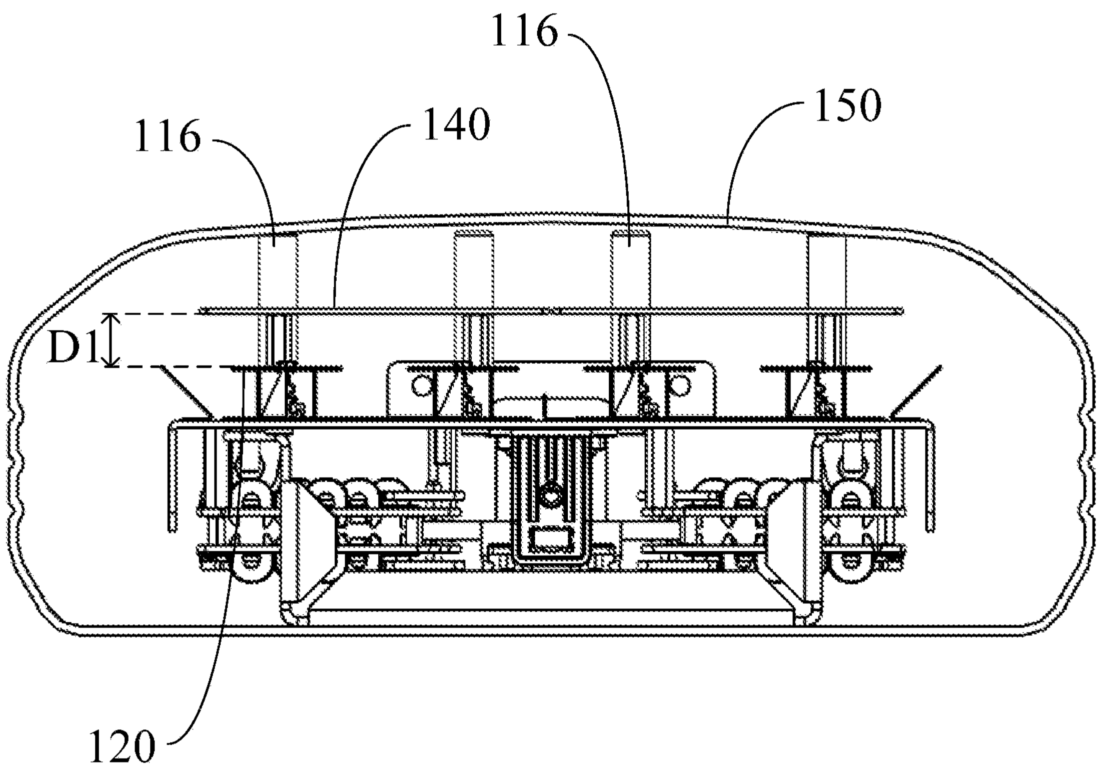
FIG. 5 is a front view of the base station antenna of the present disclosure.

Please refer to FIG. 5, in the base station antenna 100 of the present disclosure, a first distance D1 is between the dielectric plate 140 and a top surface of the plurality of oscillators 120 away from the first surface 112, and the first distance D1 is 0.25 times a wavelength of a center frequency point of the base station antenna 100. That is, when the center frequency point of the base station antenna 100 is 3.8 GHz, a value of the first distance D1 will be 17 mm, but this is not a limitation. In other words, when the center frequency point of the base station antenna 100 is changed to other values for different needs, the value of the first distance D1 will also be able to be adjusted accordingly.

Further, as shown in FIGS. 4 and 5, a plurality of spacers 116 are provided on the first surface 112 of the substrate 110, and the dielectric plate 140 is disposed on the plurality of spacers 116 so as to be located above the plurality of oscillators 120. The plurality of spacers 116 extend from the first surface 112 of the substrate 110 toward the antenna cover 150 and through the dielectric plate 140.

In the base station antenna 100 of the present disclosure, the dielectric plate is preferably a FR4 dielectric plate to enhance the performance of the electromagnetic waves emitted by the base station antenna 100. The plurality of oscillators 120 are PCB oscillators, which have advantages of small size, light weight, easy and flexible installation and lower cost compared with traditional die-casting oscillators. A working frequency band of the plurality of oscillators 120 ranges from 3.4 GHz to 4.2 GHz.

Figure 6:
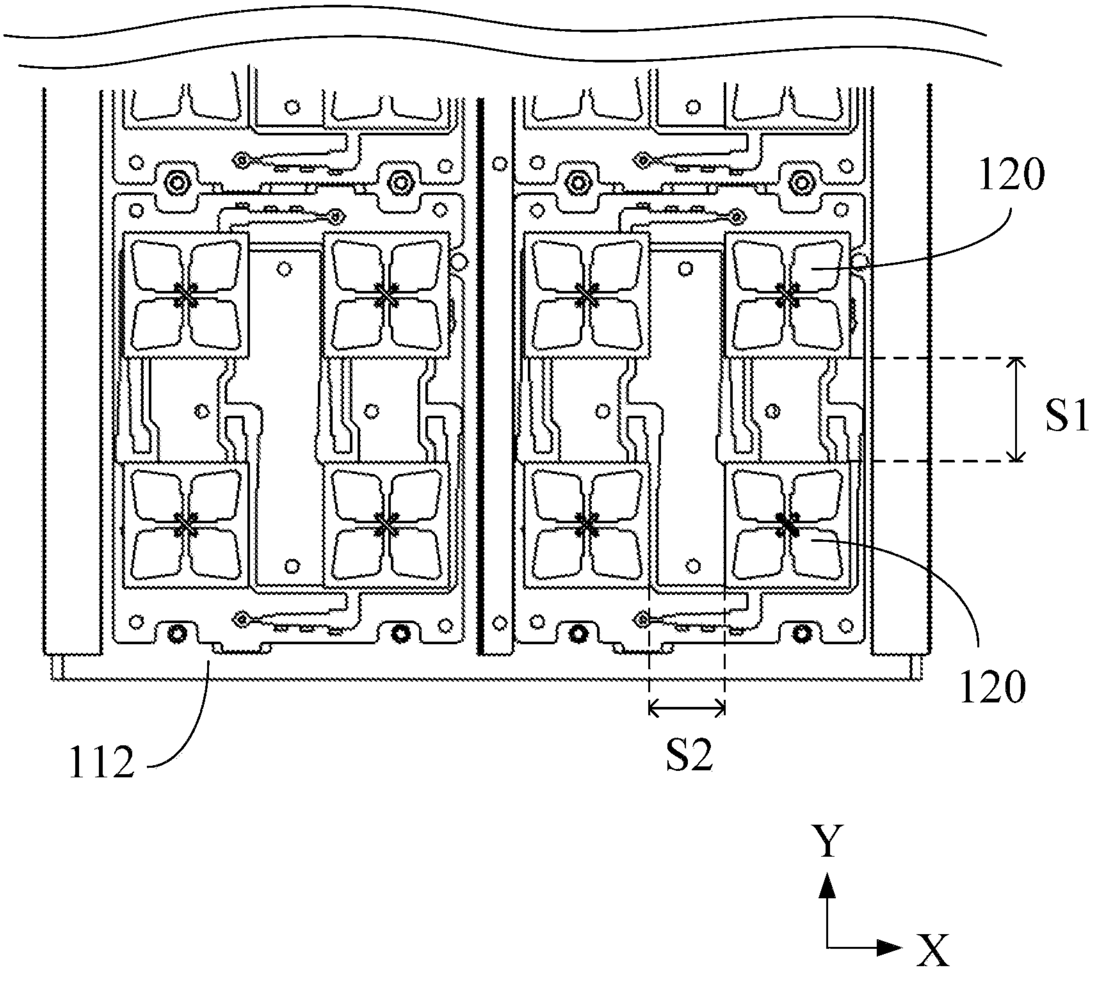
FIG. 6 is a schematic view of the base station antenna of the present disclosure with oscillators disposed on a first surface of a substrate.

As shown in FIG. 6, in the base station antenna 100 of the present disclosure, the plurality of oscillators 120 are disposed at intervals on the first surface 112 of the substrate 110 to present an array arrangement. Two adjacent oscillators 120 of the plurality of oscillators 120 have a first interval S1 in a first direction (i.e., the vertical direction), and the first interval S1 is 0.7 times a wavelength of the center frequency point of the base station antenna 100. Two adjacent oscillators 120 of the plurality of oscillators 120 have a second interval S2 in a second direction X (i.e., the horizontal direction) perpendicular to the first direction Y, and the second interval S2 is 0.6 times the wavelength of the center frequency point of the base station antenna 100. The plurality of oscillators 120 are all composed of printed circuit boards, so that when the plurality of oscillators 120 are used in the MIMO antenna of the present disclosure, costs and product weight can be greatly reduced, and an intermodulation performance can be effectively improved at the same time.

For example, as described above, when the center frequency of the base station antenna 100 is 3.8 GHz, the first interval S1 of the adjacent oscillators 120 of the plurality of oscillators 120 in the first direction Y can be obtained by calculation as 55 mm, and the second interval S2 of the two adjacent oscillators 120 in the second direction X of the plurality of oscillators 120 is 48 mm, but this is not a limitation. In other words, when the center frequency of the base station antenna 100 is changed to other values due to different requirements, the values of the first interval S1 and the second interval S2 will also be adjusted accordingly.

Figure 7:
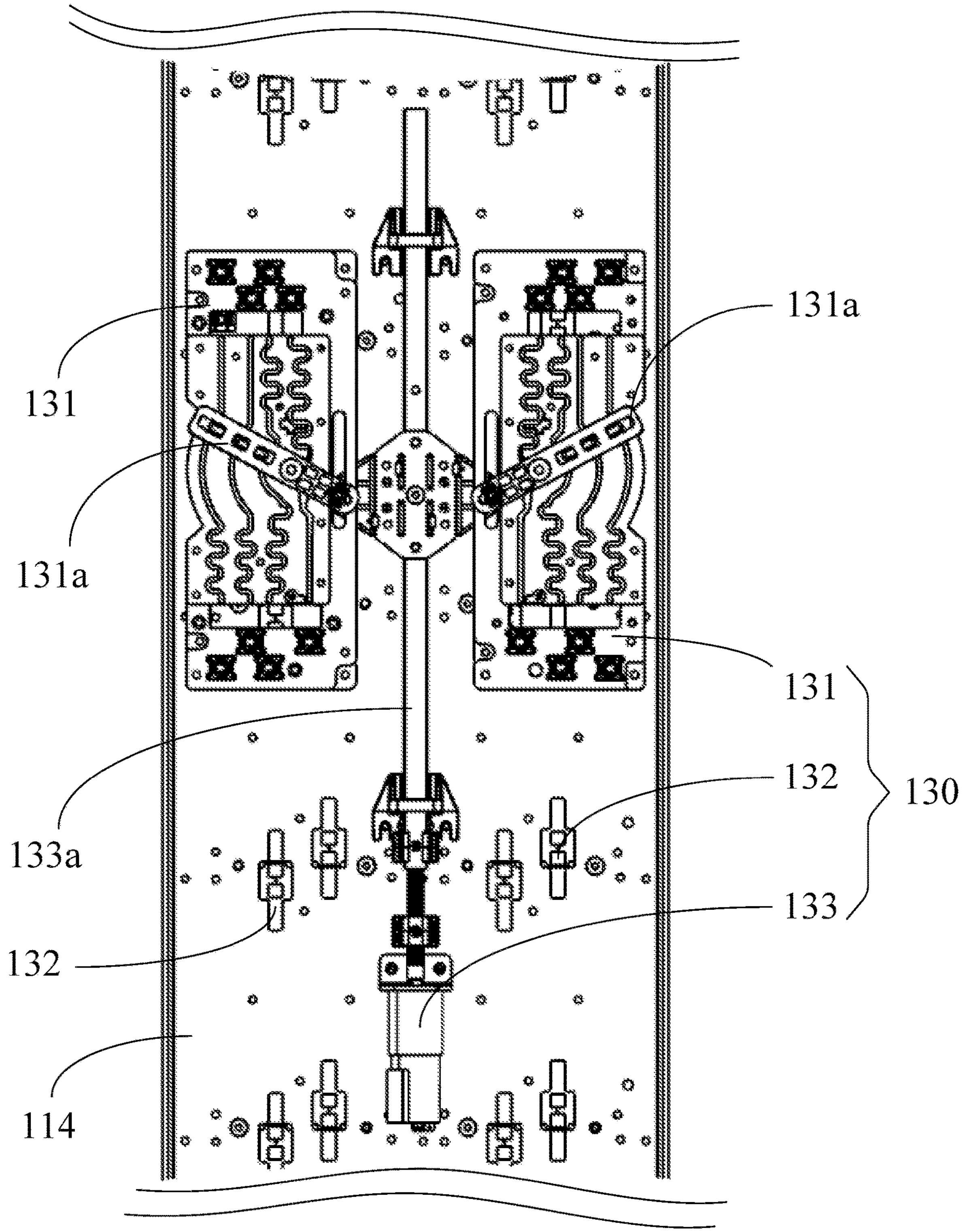
FIG. 7 is a schematic view of phase shifters, power dividers, and a motor drive system of the base station antenna of the present disclosure disposed on a second surface of the substrate.

As shown in FIG. 7, the control assembly 130 comprises a plurality of phase shifters 131, a plurality of power dividers 132 and a motor drive system 133. The plurality of phase shifters 131, the plurality of power dividers 132 and the motor drive system 133 are disposed on the second surface 114 of the substrate 110. The plurality of power dividers 132 are disposed between the plurality of oscillators 120 and the plurality of phase shifters 131, one end of the plurality of power dividers 132 is electrically connected to the plurality of oscillators 120, and the other end of the plurality of power dividers 132 is electrically connected to the plurality of phase shifters 131. The motor drive system 133 is used to pull slider 131*a* on the phase shifter 131 to slide up and down along a drive shaft 133*a*, thereby adjusting the downward tilt of the plurality of phase shifters 131.

In detail, in the present disclosure, the power divider 132 can be a one-to-four power divider 132, and the phase shifter 131 can be a one-to-seven pointer arc-shaped phase shifter 131. When every four oscillators 120 among the plurality of oscillators 120 are connected to the one-to-four power divider 132 as a subunit, and seven subunits correspond to the one-to-seven pointer arc-shaped phase shifter 131, it can be pulled by the motor drive system 133 on the one-to-seven pointer arc-shaped phase shifter 131 slide 131*a* along the drive shaft 133*a* up and down to achieve the effect of ESC downward inclination.

In a preferred embodiment, the power divider 132 and phase shifter 131 are electrically connected via a coaxial cable (not shown), but this is not a limitation.

The base station antenna 100 of the present disclosure further comprises an antenna cover 150, which is disposed on the periphery of the substrate 110 to cover the substrate 110, the plurality of oscillators 120, the control assembly 130, and the dielectric plate 140, so that the dielectric plate 140 is located between the antenna cover 150 and the oscillators 120. The antenna cover 150 is used to protect the substrate 110, the plurality of oscillators 120, the plurality of phase shifters 131, the plurality of power dividers 132, the motor drive system 133 and the dielectric plate 140. The material of the antenna cover 150 may include, but is not limited to, polycarbonate (Polycarbonate) and polyacrylonitrile (ABS). In an example, the antenna cover 150 and the substrate 110 can be assembled by snap-fitting to facilitate subsequent maintenance of the base station antenna 100. In another example, the antenna cover 150 and the substrate 110 can be assembled by bonding to prevent moisture from entering the internal space of the base station antenna 100. In actual situations, the method of assembling the antenna cover 150 and the substrate 110 can be adjusted according to actual requirements.

In summary, in the prior art, when an antenna cover surrounds a plurality of oscillators on a substrate, the plurality of oscillators guide and amplify the electromagnetic radiation emitted by the base station antenna will be affected by the shielding of the antenna cover and the performance of the emitted electromagnetic radiation will be reduced. However, in the embodiment of the present disclosure, by making the first distance D1 (preferably 17 mm) between the dielectric plate 140 and the top surface of the plurality of oscillators 120, and making the dielectric plate 140 an FR4 dielectric plate, the wavelength of the electromagnetic waves emitted by the base station antenna 100 after being guided and amplified by the plurality of oscillators 120 changes after entering the FR4 dielectric plate, so as to eliminate the influences of the antenna cover 150 on the wavelength of the electromagnetic waves, making the base station antenna 100 of the present disclosure have excellent transmitting and receiving performance, and can avoid waste of debugging labor. In other words, the dielectric plate 140 of the present disclosure is not a reflector plate, which does not reflect the electromagnetic radiation emitted by the base station antenna 100. On the contrary, the dielectric plate 140 of the present disclosure can be used to compensate for the wavelength affected by the antenna cover 150. Therefore, after the plurality of oscillators guide and amplify the electromagnetic radiation emitted by the base station antenna passing through the dielectric plate 140, the antenna performance can be consistent with the simulation test.

In addition, the plurality of oscillators 120 of the present disclosure are PCB oscillators, which have advantages of small size, light weight, easy and flexible installation and lower cost compared with traditional die-casting oscillators, and are therefore particularly suitable for MIMO technology. Furthermore, the phase shifter 131 of the present disclosure is an arc-shaped phase shifter, which not only has a lower material cost compared to the cavity phase shifter used in the prior art, but also is more convenient to assemble and maintain.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A base station antenna, comprising:

a substrate comprising a first surface and a second surface disposed opposite to the first surface;

a plurality of oscillators, disposed on the first surface of the substrate;

a control assembly, disposed on the second surface of the substrate and electrically connected to the plurality of oscillators; and a dielectric plate, disposed corresponding to the first surface of the substrate, wherein the plurality of oscillators are disposed between the first surface and the dielectric plate;

wherein a first distance is between the dielectric plate and a top surface of the plurality of oscillators away from the first surface, and the first distance is 0.25 times a wavelength of a center frequency point of the base station antenna;

wherein the dielectric plate having the first distance from the top surface of the plurality of oscillators away from the first surface is a FR4 dielectric plate to change a wavelength of electromagnetic waves emitted by the base station antenna after entering the FR4 dielectric plate.

2. The base station antenna according to claim 1, wherein the first distance is 17 mm.

3. The base station antenna according to claim 1, wherein the plurality of oscillators are PCB oscillators, and a working frequency band of the plurality of oscillators ranges from 3.4 GHz to 4.2 GHz.

4. The base station antenna according to claim 1, wherein a plurality of spacers are provided on the first surface of the substrate, and the dielectric plate is disposed on the plurality of spacers so as to be located above the plurality of oscillators.

5. The base station antenna according to claim 1, wherein the plurality of oscillators are disposed at intervals on the first surface of the substrate, two adjacent oscillators of the plurality of oscillators have a first interval in a first direction, and the first interval is 0.7 times a wavelength of a center frequency point of the base station antenna.

6. The base station antenna according to claim 5, wherein two adjacent oscillators of the plurality of oscillators have a second interval in a second direction perpendicular to the first direction, and the second interval is 0.6 times the wavelength of the center frequency point of the base station antenna.

7. The base station antenna according to claim 1, wherein the plurality of oscillators are disposed at intervals on the first surface of the substrate, two adjacent oscillators of the plurality of oscillators have a first interval in a first direction, and the first interval is 55 mm.

8. The base station antenna according to claim 7, wherein two adjacent oscillators of the plurality of oscillators have a second interval in a second direction perpendicular to the first direction, and the second interval is 48 mm.

9. The base station antenna according to claim 1, wherein the control assembly comprises a plurality of phase shifters and a plurality of power dividers, the plurality of phase shifters and the plurality of power dividers are disposed on the second surface of the substrate.

10. The base station antenna according to claim 9, wherein the power divider is electrically connected to the phase shifter by a coaxial cable.

11. The base station antenna according to claim 9, wherein the control assembly further comprises a motor drive system disposed on the second surface of the substrate, the motor drive system is configured to pull a slide to adjust a downward tilt of the plurality of phase shifters.

12. The base station antenna according to claim 1, further comprising an antenna cover, wherein the antenna cover covers the substrate, the plurality of oscillators, the control assembly, and the dielectric plate, the dielectric plate is located between the antenna cover and the oscillators.

* * * * *